United States Patent [19]

Fortin

[11] Patent Number: 4,982,499
[45] Date of Patent: Jan. 8, 1991

[54] POTATO PEELER

[75] Inventor: Jacques Fortin, 7 Montaigne, Lévis, Quebec, Canada, G6V 8K4

[73] Assignee: Jacques Fortin, Levis, Canada

[21] Appl. No.: 303,297

[22] Filed: Jan. 30, 1989

[51] Int. Cl.$^5$ .......................... A22B 5/16; A23N 7/02; A49J 17/00

[52] U.S. Cl. ..................................... 30/123.5; 99/591; 99/623

[58] Field of Search ..................... 30/123.5, 123.6, 124; 90/541, 589, 623; 83/368; 94/591, 623

[56] References Cited

U.S. PATENT DOCUMENTS

| | | | |
|---|---|---|---|
| 1,827,869 | 10/1931 | Casey | 99/591 |
| 2,396,444 | 3/1946 | Singer | 99/591 |
| 4,068,574 | 1/1978 | Amstad | 99/623 |
| 4,430,931 | 2/1984 | Hsu | 99/589 |
| 4,550,656 | 11/1985 | Kirk | 30/123.6 |

FOREIGN PATENT DOCUMENTS 655382 4/1979 U.S.S.R. ................................ 99/623
1340720 9/1987 U.S.S.R. ................................ 99/623

Primary Examiner—Douglas D. Watts
Assistant Examiner—Paul M. Heyrana, Sr.

[57] ABSTRACT

New apparatus for peeling potato is disclosed. This hand-operated device includes a cylindrical container in which slides a spherical basket. The container is fitted, on inside wall, with spring mounted cutters forming together a self-adjustable peripheral peeling tool. The basket is formed by concentric ribs which are located to slide between each cutter when both the basket and the container are nested together. For peeling, the potato is introduced into the basket which, in turn, is inserted inside the container; using a long handle, the basket is subjected to alternating up and down motion. The enclosed potato rotates freely inside the basket to different positions, before passing through the aperture formed by a set of peripheral cutters. The wastes are collected inside the container, which could be opened at bottom for cleaning. The basket is equipped with a retractable handle to house completely inside the container for storage.

6 Claims, 5 Drawing Sheets

POTATO PEELER

FIELD OF THE INVENTION

This invention relates to manually operable tools used for peeling a small quantity of potatoes, and more specifically, to a potato peeler which works on a single potato at one time.

BACKGROUND OF THE INVENTION

Most of the time, a single knife is commonly used for peeling potatoes.

U.S. Pat. No. 4,430,931 dated Feb. 14, 1984 describes a peeling device consisting of pairs of knives for generally cylindrical vegetables held in fixed position and resulting in a defined geometric shape but which does not follow the initial contour of the potato.

U.S. Pat. No. 1,988,098 reveals peeling knives carried by spring restained arms in position for peeling leguminous tubers but the vegetable is not free to move.

U.S. Pat. No. 2,699,806 describes knives so arranged to slit the skin of nuts, as an industrial machine, but too complex for home utilization.

There are some peeling devices provided with means to control deepness of the peel removed. Even with special kind of knife it takes two hands, dexterity and time to get a clean economical result. Some care is needed to collect the wastes; if potatoes have not been previously washed, peeling is a messy operation.

OBJECTS OF THE INVENTION

This invention aims to replace with advantages the use of knife by being safer and more efficient than a knife, and replace some expensive peeling devices, for home applications. Its unique and innovative functional features are as follows:

A- Peeling operation consists in moving a basket inside a cylinder with an alternating vertical sliding motion.
B- The potato is peeled by a self-adjustable peripheral set of spring mounted cutters.
C- All wastes are collected inside the device and could be dumped directly from said device to the garbage.
D- The discharge end of the apparatus could be made adaptable to a kitchen sink crusher.
E- Components could be dismantled and rinced under the galley's faucet.
F- The device could be adapted for use by handicapped one-hand persons.
G- The final geometry of the potato is very close to that of the original shape, thus resulting in a minimum of waste.

BRIEF DESCRIPTION OF THE DRAWINGS

The following drawing figures are provided to assist in understanding the preferred embodiment discussed herein.

DESCRIPTION OF THE PREFERRED EMBODIMENT

Figure 1:
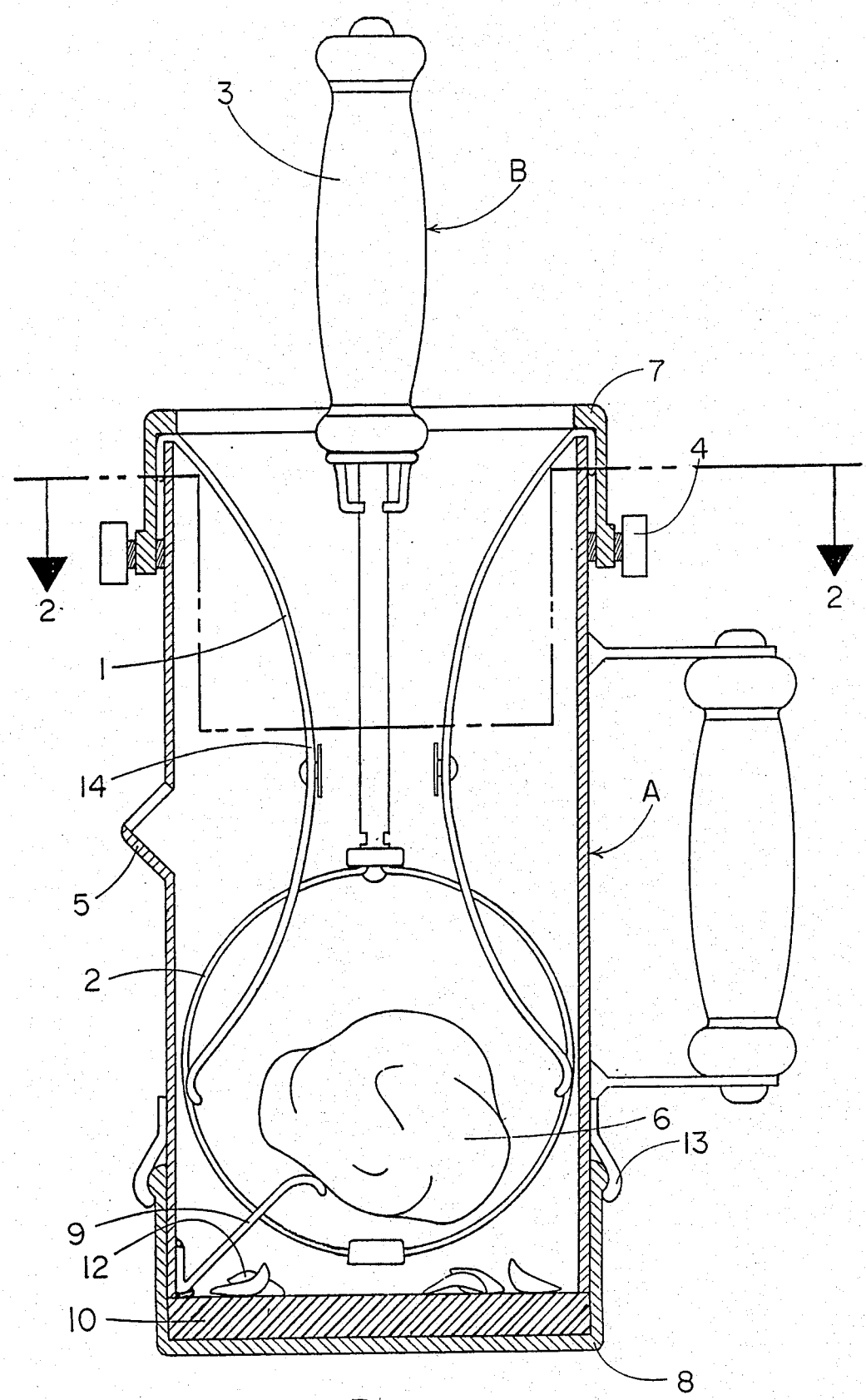
FIG. 1 is a side view in vertical cross section of the apparatus according to one embodiment of the present invention, and showing a potato in the apparatus.
Figure 2:
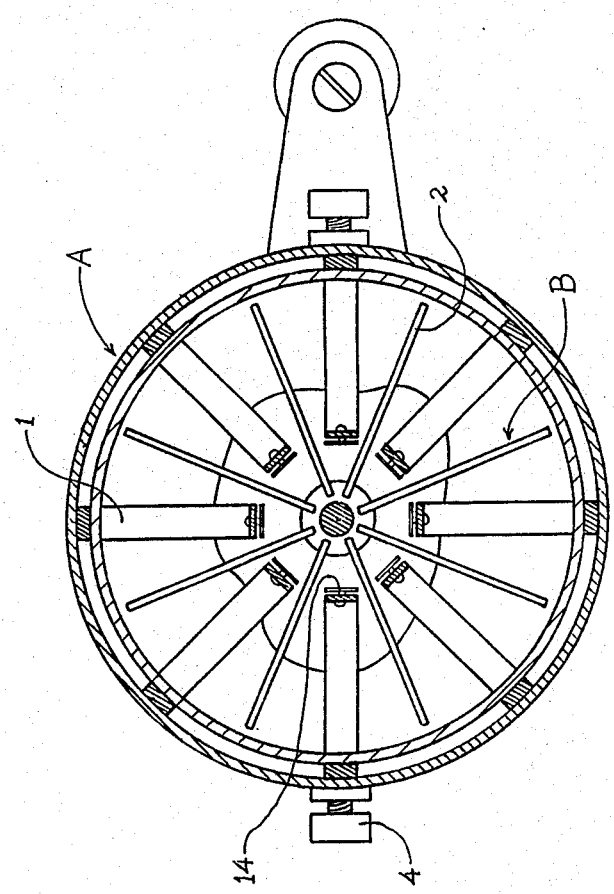
FIG. 2 is a top view in horizontal cross section of the apparatus along line 2—2 of FIG. 1.
Figure 3:
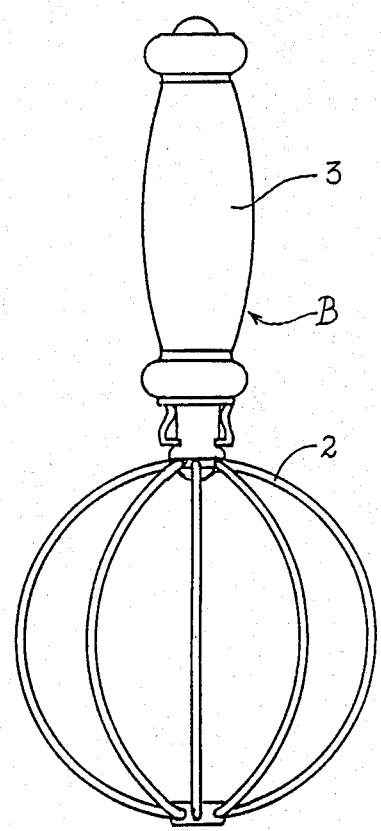
FIG. 3 is an elevation of the spherical basket (B) (shown with handle retracted).

As shown on drawings FIG. 1, FIG. 2 and FIG. 3, the apparatus consists mainly of two components (A) and (B), which could be nested together.

Figure 5:
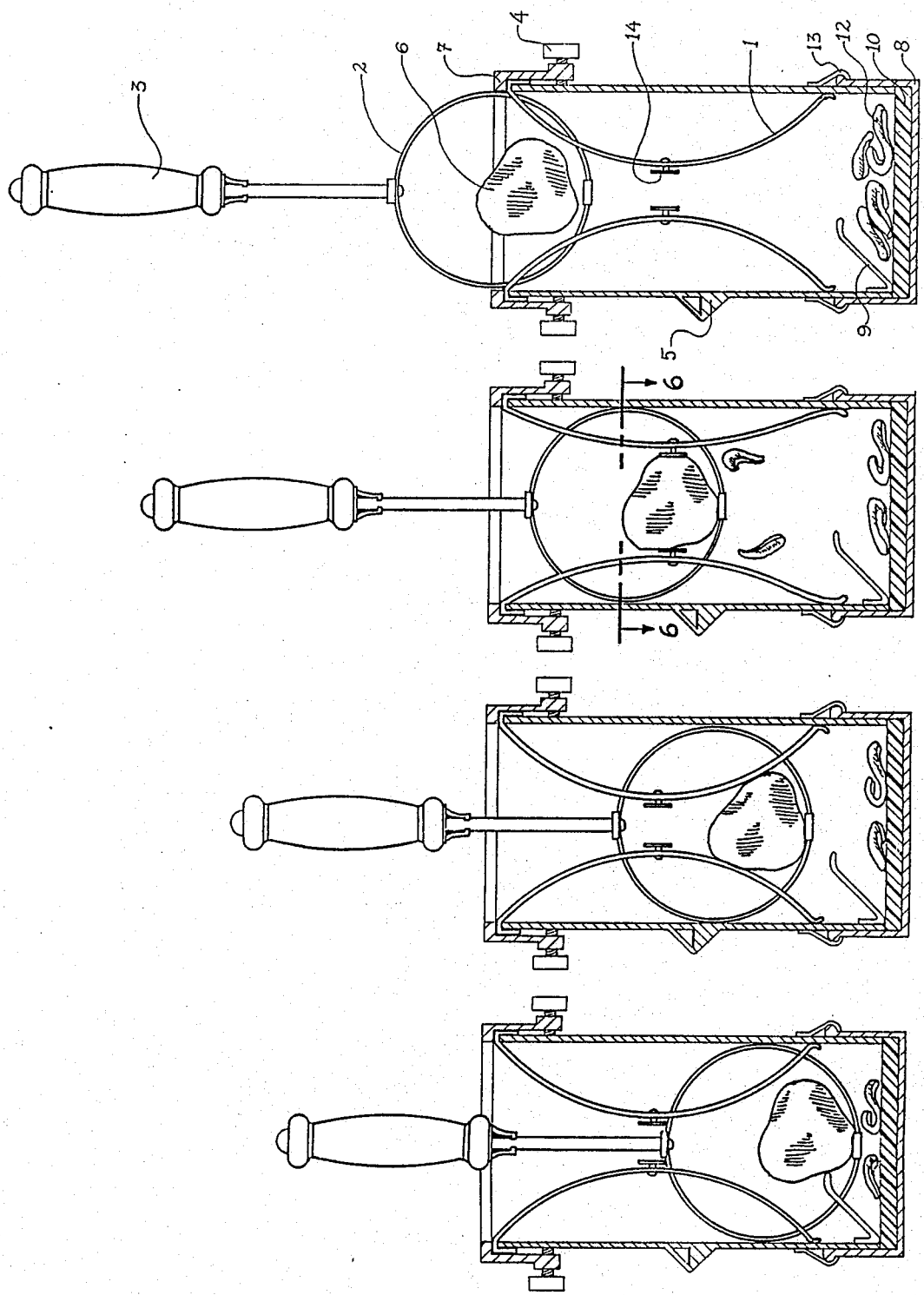
FIG. 5 is a side view in vertical cross section of the apparatus as per FIG. 1 but showing four positions of the spherical basket (B) in container (A).
Figure 6:
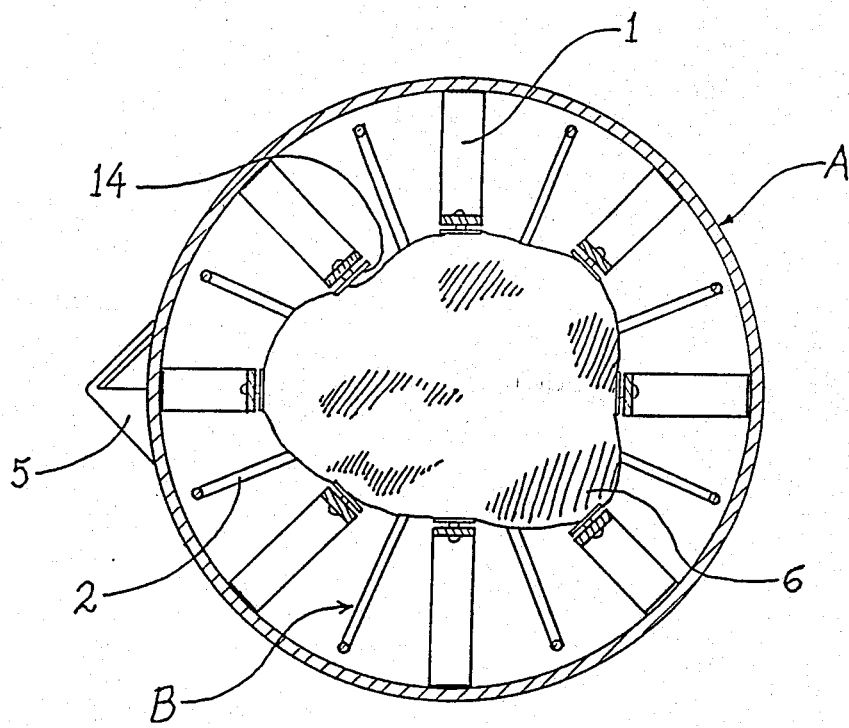
FIG. 6 is a top view in horizontal cross section of the apparatus as per FIG. 5 position P3 and showing the lamellae of container (A) in a position cutting along the shape of the potato. It should be understood that the embodiment illustrated in the drawing is not considered to be limiting of the invention.

Container (A) also called cylinder, is fitted with internal peripheral spring lamellae 1 equally spaced, on which round cutters 14 are fitted. The spring lamellae 1 FIG. 1, are maintened in position at upper end by a collar 7, equipped with set of screws 4 for tensionning, the lower-ends bearing on wall of cylinder (A) are free to slide vertically, when spring lamellae 1 are compressed, see FIG. 5 showing simulation of the operation positions P1, P2, P3, P4.

Spherical basket (B) is made by radial concentric ribs 2 located to slide between the cutters 14 when the basket (B) is moving inside the cylinder (A). Some ribs 2 could be spread to allow insertion of potato 6. This basket (B) is also fitted with a retractable handle 3 with lock device for extended position. A tripping lever 9 is installed at lower end of container (A) and located to clear basket's ribs. Bottom of container (A) is closed by a waste collecting cup 8, which is maintained by side snaps 13, for easy removal. The bottom of cup 8 is protected by a thick rubber disk 10. The container (A) is also provided with a protruded external conical knife 5 and a slicer extruded slot (not shown on drawing).

Functional importance of all mentioned above components is discussed in the following operations procedure.

OPERATION OF THE APPARATUS

The invention is used to peel one potato at a time. Basket (B) is pulled out of cylinder (A), handle 3 is extended and automatically locked to maximum length. The basket's ribs 2 are spread and potato is inserted inside; the space inside basket is sufficient to allow free motion of almost any size of potato; if potato is abnormally big, it must be cutted in two halves to be peeled separately.

The basket (B) is moved inside the cylinder (A) in an up and down, piston like motion, as is shown in FIG. 5, position P1, P2, P3, P4.

A better understanding of the operation will be had by a study of the four positions illustrated in FIG. 5.

Position 4 is when the potato has been loaded into the basket (B) and said basket charged into the cylinder (A).

Position 3 is when the cutters engage into the skin of the potato passing downwards.

Position 2 is attained after the cutting of the peel during the downward pushing of the handle and basket (B).

Figure 4:
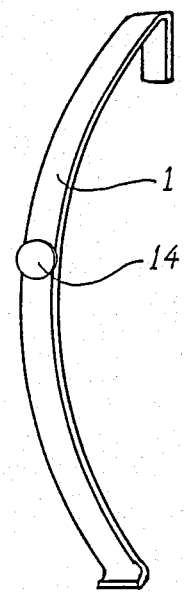
FIG. 4 is an isometric view of one, spring mounted, cutter.

Position 1 is attained when the basket hits the bottom of container (A) and the potato is tripped by lever 9 and changes position. Similarly during the upward motion the potato is moved to position P2 just before cutting of the peel, followed by position P3 during cutting and position P4 after cutting. The cutters 14 FIG. 4 chip parts of peel 12, collected inside container (A); the spring lamellae 1 provide adjustment for particular shapes and control deepness of cut.

During the operation, the potato is continuously turning before striking peripheral, self-adjustable spring mounted, cutters 14; this motion is accentuated by means of the tripping lever 9, which extends inside basket ribs 2 at the end of the downward stroke. A rubber disk 10 at the bottom of cylinder (A) serves to damp noises generated during operation.

After several strokes, the basket (B) is pulled out and the scalped potato is inspected; if some cavities still exist they could be cleaned using the extruded conical knife 5. An external extruded slot is located on container side not shown on drawing and is used for chipping any residual spots.

The collected wastes 12 are disposed by removing the bottom cup 8. After cleaning of the apparatus under the galley's faucet, the basket handle 3 is compressed, and components are nested together and stored, ready for future utilization.

Although a specific embodiment has been shown, it should be understood that the illustrations of its elements have been made by way of example only.

Various modifications to the structure shown and to operating parameters described will be apparent to those of ordinary skills in the art, without departing from either the spirit or scope of the invention.

OTHER POSSIBLE APPLICATIONS

Apparatus to peel fruits of vegetables, on the same principle, but with size of elements adapted to dimensions and shapes of the object.

The invention could also be adapted with means of holding for handicapped people.

I claim:

1. A peeling apparatus comprising an elongated container, cutters carried within an intermediate section of the container and moveable transversely of the container, means biasing said cutters towards the longitudinal axis of said container, a basket for loosely surrounding an article to be peeled so that said article may rotate in all directions within the basket, means to reciprocate the basket within the container along the longitudinal axis of the container, said basket providing passages permitting insertion of said cutters within said basket during recriprocating movement of said basket.

2. An apparatus, as defined in claim 1, in which the said basket is formed by radial concentric ribs located to slide between the said cutters; the said ribs could be opened to insert the said article, which is free to rotate within the basket during the peeling operation.

3. An apparatus, as defined in claim 1, in which the said container can be opened for dumping of collected wastes.

4. The peeling apparatus of claim 1 wherein said biasing means are curved lamellae springs bearing at their ends against the inner face of said container, said cutters secured to the center portion of said lamellae springs.

5. The peeling apparatus of claims 1 wherein said means to reciprocate said basket is a handle fixed to said basket.

6. The peeling apparatus of claim 1 wherein said cutters are chipping in both directions of the reciprocating strokes.

* * * * *